US009146543B2

(12) United States Patent
Mao

(10) Patent No.: US 9,146,543 B2
(45) Date of Patent: Sep. 29, 2015

(54) METHOD FOR PREVENTING SYSTEM INVALIDATION

(71) Applicant: IBASE TECHNOLOGY INC., Taipei (TW)

(72) Inventor: Jackson Mao, Taipei (TW)

(73) Assignee: IBASE TECHNOLOGY INC., Taipei (TW)

( * ) Notice: Subject to any disclaimer, the term of this patent is extended or adjusted under 35 U.S.C. 154(b) by 352 days.

(21) Appl. No.: 13/904,125

(22) Filed: May 29, 2013

(65) Prior Publication Data
US 2014/0330403 A1 Nov. 6, 2014

(30) Foreign Application Priority Data
May 1, 2013 (TW) .............................. 102115608 A

(51) Int. Cl.
*G05B 11/01* (2006.01)
*G06F 15/16* (2006.01)
*G06F 15/173* (2006.01)
*G05B 9/02* (2006.01)

(52) U.S. Cl.
CPC ........................................ *G05B 9/02* (2013.01)

(58) Field of Classification Search
CPC ......... H04L 43/10; H04L 69/40; H04L 45/22; H04L 12/2678; H04L 29/08612
USPC ............... 700/19–21; 709/203, 224, 230, 235
See application file for complete search history.

(56) References Cited

U.S. PATENT DOCUMENTS

| 7,835,265 | B2* | 11/2010 | Wang et al. | 370/216 |
| 7,917,613 | B2* | 3/2011 | Letca et al. | 709/224 |
| 8,730,929 | B2* | 5/2014 | Tao | 370/338 |
| 8,819,244 | B2* | 8/2014 | Tung et al. | 709/227 |
| 2004/0013118 | A1* | 1/2004 | Borella | 370/395.2 |
| 2007/0058258 | A1* | 3/2007 | Mather et al. | 359/619 |
| 2007/0180077 | A1* | 8/2007 | Letca et al. | 709/223 |
| 2009/0287955 | A1* | 11/2009 | Matsumoto et al. | 714/4 |
| 2010/0149996 | A1* | 6/2010 | Sun | 370/244 |
| 2011/0211441 | A1* | 9/2011 | Matityahu et al. | 370/217 |
| 2011/0252144 | A1* | 10/2011 | Tung et al. | 709/227 |
| 2012/0246339 | A1* | 9/2012 | Huang et al. | 709/239 |
| 2013/0124607 | A1* | 5/2013 | Griffith et al. | 709/203 |
| 2013/0124718 | A1* | 5/2013 | Griffith et al. | 709/224 |
| 2013/0124752 | A1* | 5/2013 | Griffith et al. | 709/235 |
| 2014/0020119 | A1* | 1/2014 | Zollinger et al. | 726/30 |
| 2014/0078887 | A1* | 3/2014 | Yu et al. | 370/219 |

* cited by examiner

*Primary Examiner* — Ronald Hartman, Jr.
(74) *Attorney, Agent, or Firm* — Lin & Associates IP, Inc.

(57) ABSTRACT

The present invention relates to a method for preventing system invalidation including the microcontroller transferring the specific packet to the primary electronic device which operates according to the operation commands sent from the upstream device to provide the specific service, the primary electronic device returning the return packet, the microcontroller receiving the return packet, the microcontroller determining if the return packet is returned within a preset rang, if yes, repeating the above steps, if not, activating the spare electronic device to take over the primary electronic device to provide the specific service, and shutting down power supply of the primary electronic device. Therefore, the present invention ensures the spare electronic device smoothly takes over the task of the primary electronic device which accidentally fails, thereby preventing the whole system from being invalidated and improving the stability and reliability of the system operation.

5 Claims, 2 Drawing Sheets

METHOD FOR PREVENTING SYSTEM INVALIDATION

CROSS-REFERENCES TO RELATED APPLICATIONS

This application claims the priority of Taiwanese patent application No. 102115608, filed on May 1, 2013, which is incorporated herewith by reference.

BACKGROUND OF THE INVENTION

1. Field of the Invention

The present invention generally relates to a method for preventing system invalidation, and more specifically to a method for preventing system invalidation by activating one of the spare electronic devices to take over the operation performed by the primary electronic device which accidentally fails, so as to prevent the whole system from being invalidated or crashing.

2. The Prior Arts

Many high-end electronic devices require very stable and reliable operational efficiency, like 24-hour running for a considerable long term. In general, some typical examples are the high-end business server providing electronic business service for banks and network transactions, the real time surveillance apparatus closely monitoring important and crucial sites such as airports and nuclear electric power plant, the supervision system providing special long-term security and door guarding, the control management system managing traffic signs, electric power transmission lines and military weapons, or the confidential intra-network system interconnecting government departments.

To meet the requirement of high stability and reliability for the above-mentioned devices or systems, the manufacturers usually have to employ specific, costly electric components with excellent stability of operation, or dramatically increase the safety factor of the design. However, each component inherently has some risk of invalidation, and any design with high tolerance may also suffer accidental invalidation due to the actual engineering variation in processing and manufacturing. Thus, certain discrete components accidentally failing may invalidate the whole system to crash or even result in permanent damage or serious loss, such as lives or properties.

To overcome the problem, the commonly used solution in the prior arts is to utilize one additional backup device with the same function as the current working device. As a result, the backup device can take over the original task performed by the working device which fails to normally operate so as to keep the normal service and operation of the whole system. Take the network system for electronic business as an example, the user at the client terminal can use the PC to connect to the remote server site through wire or wireless internet. The remote server site is usually provided with the first and second servers. The first server is the primary control device and the second server is used as the backup device. Meanwhile, the first and second servers are communicated with each other via network, particular mechanism or specific interface. In other words, the first server is configured to provide network transaction service, and the second device is preset in the standby state. Therefore, when the first device is out of function and invalidated, the second server may take over the first server to continue the task performed by the first server such that the electronic business transaction will not be terminated and the user can continue the ongoing operation without sensing any abnormal happening.

However, one of the shortcomings in the prior arts is that the second device is a standalone device, and each of the first and second devices generally has different preset and/or dynamic settings in the respective BIOS (Basic Input Output System), MAC (Media Access Control) address for network controller and the display interface due to actual application such that the software configured in the second device may not immediately be used to take over the task of the first device. Thus, the second device often has to perform the synchronization process for a period of time to backup all the data temporarily processed by the first device for subsequent processes. As a result, it needs to install several packages of software, leading the cost for software license fee to dramatically increase, and even perform additional power-on/power-off procedure to guarantee the correctness of the data during the processes of transferring, copying and updating.

Therefore, it needs to provide a method for preventing system invalidation without installing more than one package of software to implement smoothly switching to the spare electronic device from the primary electronic device accidentally failing in functional operation so as to prevent the whole system from crashing or being invalidated due to some abnormal discrete devices, thereby overcoming the above problems in the prior arts.

SUMMARY OF THE INVENTION

The primary objective of the present invention is to provide a method for preventing system invalidation, wherein the system comprising a primary electronic device, at least one spare electronic device, a microcontroller, at least two terminal devices and an upstream device is prevented from operational invalidation. In particular, the primary electronic device and the at least one spare electronic device are connected to the first and second terminal devices, the microcontroller and the upstream device, wherein the at least two terminal devices comprises the first and second terminal devices. Specifically, the method for preventing system invalidation of the present invention comprising the following steps.

Using the microcontroller to transfer the specific packet to the primary electronic device via the transmission interface, wherein the primary electronic device and the at least one spare electronic device are electrically connected to the terminal devices through the electrical connection circuitry, the upstream device is connected to the primary electronic device and the at least one spare electronic device through the connection interface, the upstream device generates and transfers operation commands via the connection interface, and the primary electronic device receives the operation commands to control the at least two terminal devices; the primary electronic device receiving the specific packet and then returning the return packet to the microcontroller, wherein the return packet is the specific packet or different from the specific packet; the microcontroller receiving the return packet from the primary electronic device; the microcontroller inspecting the return packet and determining whether the period of time between the specific packet transferring and the return packet received is within a preset range, if yes, the primary electronic device being determined to be normal and repeating the above steps, and if not, the primary electronic device being determined to be abnormal, and turning on power supply of the spare electronic device selected from the at least one spare electronic device, wherein the spare electronic device is connected to the at least two terminal devices through the above electrical connection circuitry; the microcontroller prohibiting the primary electronic device from controlling the at least two terminal devices, activating the spare electronic device to receive the operation commands from the upstream device and control the at least two terminal devices according to the operation commands such that the spare electronic device takes over the primary electronic device to provide the specific service; and shutting down power supply of the primary electronic device within a preset safe period of time.

The above-mentioned upstream device is a BIOS (basic input/output system), a device, computer or server comprising the BIOS. The primary and spare electronic devices are selected from a group consisting of a microcomputer, computer or server. The terminal device is selected from a group consisting of a hard disk, disk array, display device, computer, mobile phone, tablet PC or electronic terminal The transmission interface is a serial transmission interface, such as RS-232 or serial port interface. The connection interface comprises SATA (Serial Advanced Technology Attachment) interface, USB (universal serial bus) interface of flash memory interface.

Accordingly, the present invention ensures the spare electronic device smoothly takes over the task of the primary electronic device which accidentally fails, thereby preventing the whole system from invalidation and improving the stability and reliability of the operation.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
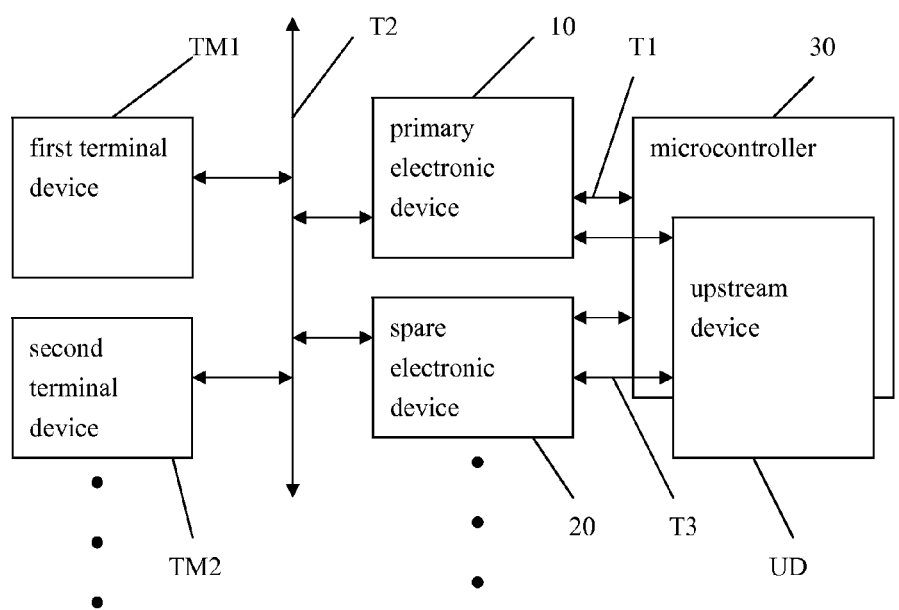
FIG. 1 is a view schematically showing a system architecture used in the method for preventing system invalidation according to the present invention.
Figure 2:
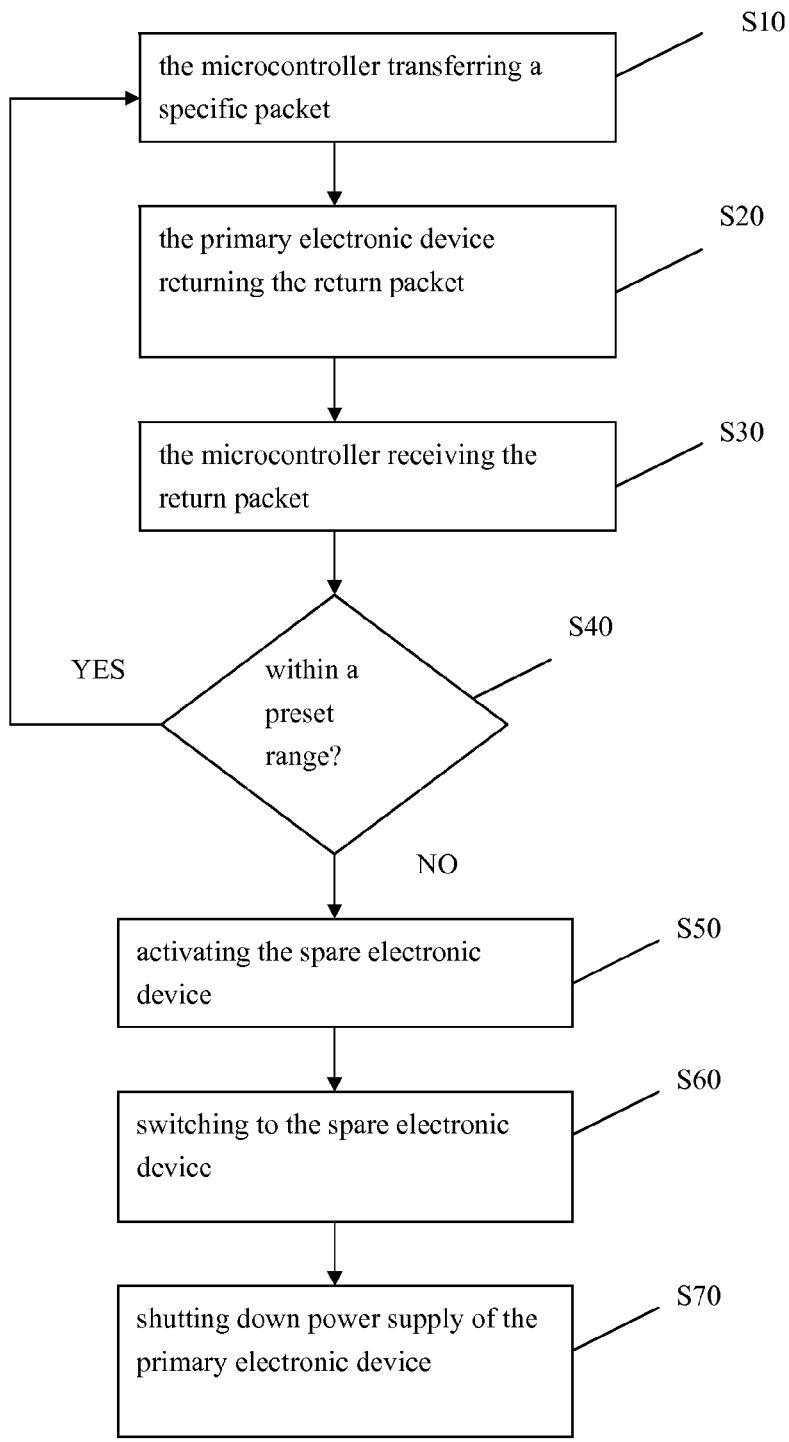
FIG. 2 is a flowchart of the method for preventing system invalidation according to the present invention.

Please refer to FIGS. 1 and 2. FIG. 1 is a view schematically showing the system architecture used in the method for preventing system invalidation according to the present invention, and FIG. 2 is a flowchart of the method of the present invention. As shown in FIG. 1, the system used by the method of the present invention for providing the specific service comprises the primary electronic device 10, at least one spare electronic device 20, at least two terminal devices (such as the first terminal device TM1 and the second terminal device TM2), the microcontroller 30 and the upstream device UD. The primary electronic device 10 and the spare electronic device 20 are electrically connected to the at least two terminal devices, the microcontroller 30 and the upstream device UD. The present invention is characterized as detecting the primary electronic device 10, determining whether the primary electronic device 10 normally operates, and using the spare electronic device selected from the at least one spare electronic device 20 to take over the primary electronic device 10, thereby preventing the whole system from crashing or being invalidated due to the primary electronic device 10 accidentally failing to perform normal operation.

It should be noted that the system architecture shown in FIG. 1 comprising one spare electronic device 20 and two terminal devices (e.g. the first terminal device TM1 and the second terminal device TM2) is only one illustrative example to describe the technical characteristics of the present invention in detail, but not intended to limit the scope of the present invention. Therefore, the system of the present invention may also comprise more than one spare electronic device 20 and more than two terminal devices.

More specifically, the microcontroller 30 is connected to the primary electronic device 10 and the spare electronic device 20 through the specific transmission interface T1, and meanwhile the primary electronic device 10 and the spare electronic device 20 are connected to the first terminal device TM1 and the second terminal device TM2 through the electrical connection circuitry T2 such as network. The upstream device UD is connected to the primary electronic device 10 and the spare electronic device 20 through the connection interface T3. It is noted that the above-mentioned network is only an illustrative example of the electrical connection circuitry T2, but not limited, that is, the electrical connection circuitry T2 can be implemented by any circuitry as long as being able to provide the function of electrical connection.

Preferably, the upstream device UD is a BIOS (basic input/output system), a device computer or server comprising the BIOS. The primary and spare electronic devices 10 and 20 are selected from a group consisting of a microcomputer, computer and server. The first and second terminal devices TM1 and TM2 are selected from a group consisting of a hard disk, disk array, display device, computer, mobile phone, tablet PC and electronic terminal Furthermore, the transmission interface T1 is a serial transmission interface comprising RS-232 or serial port interface, the network implemented for the electrical connection circuitry T2 may comprise wire or wireless network, and the connection interface T3 comprises SATA (Serial Advanced Technology Attachment) interface, USB (universal serial bus) interface of flash memory interface.

The upstream device UD contains at least a power-on command, generates and transfers operation commands via the connection interface T3. The primary electronic device 10 receives the operation commands to control the at least two terminal devices (YM1 and TM2) to provide the specific service. It should be noted that at the beginning, the terminal devices YM1 and TM2 are controlled only by the primary electronic device 10, and the spare electronic device 20 is not involved.

For detailed description of the present invention, an illustrative example is provided below with the first terminal device TM1 configured to a hard disk and the second terminal device TM2 being a display device. Specifically, the first terminal device TM1 stores a plurality of advertisement information and the second terminal device TM2 has a display function. One of the operation commands generated by the upstream device UD is the read command used to drive the primary electronic device 10 to read the advertisement information stored in the first terminal device TM1, and transfer it to the second terminal device TM2, which displays the advertisement information received. Therefore, all the advertisement information stored in the first terminal device TM1 can be sequentially displayed and played by the second terminal device TM2 to achieve the aim of advertisement.

As shown in FIG. 2, the method for preventing system invalidation according to the present invention begins at the step S10. The microcontroller 30 is used to transfer the specific packet to the primary electronic device 10 via the transmission interface T1. The specific packet is a well-defined packet, such as the heartbeat packet in the prior arts. The heart beat packet commonly used in the interchanger can monitor and handle the connection status of each device connected without installing other drivers. For example, the heart beat packet provides bypass function for the devices connected by the in-line connection and having plug and play feature.

Next, in the step S20, the primary electronic device 10 receives the specific packet and then generates and returns the return packet to the microcontroller 30 to implement the response procedure. The return packet can be the specific packet of the primary electronic device 10, or another specific packet different from the primary electronic device 10. In the step S30, the microcontroller 30 receives the return packet from the primary electronic device 10.

Subsequently, in the step S30, the microcontroller 30 inspects and further determines whether a period of time between the specific packet transferring and the return packet received is within a preset range. If yes, the primary electronic device 10 is determined to be normal and the above steps S10, S20 and S30 are repeatedly performed. If not, the primary electronic device 10 is determined to be abnormal or invalidated. That is, the primary electronic device 10 is unable to perform normal operation to provide the specific service (e.g. displaying and playing the advertisement information). The invalidation of the primary electronic device 10 is possibly caused by operation crashing, the instability of transmitting signals, interface malfunction, losing power supply such that the primary electronic device 10 fails to respond to the microcontroller 30 within the preset time. The step S50 is then performed to activate the microcontroller 30 to recognize the spare electronic device 20 as the spare electronic device and turn-on its power supply. The power-on procedure for the spare electronic device is then activated.

It should be noted that for more than one spare electronic device 20, the spare electronic device is selected from the spare electronic devices 20 randomly or in the preset priority.

Preferably, the primary electronic device 10 and the spare electronic device 20 are powered by the power supply device (not shown), which is controlled by the microcontroller 30. Additionally, the spare electronic device 20 can receive the power-on command from the upstream device UD after being powered on, thereby implementing the desired power-on procedure.

In the step S60, the microcontroller 30 prohibits the primary electronic device 10 from controlling the at least two terminal devices, and activates the spare electronic device 20 to receive the operation commands from the upstream device UD. The spare electronic device 20 controls the at least two terminal devices according the operation commands received. In other words, the spare electronic device 20 takes over the primary electronic device 10, and the task originally performed by the primary electronic device 10 is continuously or newly performed by the spare electronic device 20.

Finally, the step S70 is performed by the microcontroller 30 to shut down the power supply of the primary electronic device 10 within the preset safe time so as to achieve the backup function for the system operation, thereby preventing the system from being invalidated or functionally crashing. Therefore, the method of the present invention can smoothly switch the service provided by the primary electronic device 10 to the spare electronic device 20. In the above illustrative example, the service refers to smoothly displaying the advertisement information by use of the second terminal device TM2 without being all black, stuck, flickering or distorted in the display image, such that the originally displayed advertisement information is continuously displayed and played and it is not necessary for the worker to immediately arrive and repair the invalidated device or component of the system. Accordingly, the present invention greatly reduces the repair cost and possibly maximizes the time of displaying the advertisement information.

Furthermore, Another preferred embodiment is implemented by configuring the first terminal device TM1 as the original storage medium and the second terminal device TM2 as the backup storage medium such that the service provided by the system is to backup the data stored in the first terminal device TM1 to the second terminal device TM2. Specifically, the upstream device UD drivers the primary electronic device 10 to read all the data stored in the first terminal device TM1, and then transfer the read data into the second terminal device TM2 such that the second terminal device TM2 store the data received. If the primary electronic device 10 is abnormal, the microcontroller 30 prohibits the primary electronic device 10 from performing the backup operation and activates the spare electronic device 20 to take over the backup operation. In real applications, the spare electronic device 20 may ignore what the primary electronic device 10 has performed and newly perform the backup operation. Alternatively, the upstream device UD may records the state of the backup operation, and drives the spare electronic device 20 to continue the prohibited backup operation based on the recorded state so as to avoid repeating the backup operation and increase the operation efficiency. Additionally, the state of the backup operation can be also recorded in the first terminal device TM1, and provided for the upstream device UD to read and utilized.

A yet illustrative example is further described as below. Specifically, the first terminal device TM1 is configured as the image sensing device, and the second terminal device TM2 is the alarm display device. The upstream device UD stores the monitoring software used to generate and transferring the operation commands for monitoring, referred to the monitoring command hereafter. The service provided by the system is to monitor the target site provided with the first terminal device TM1. In other words, the primary electronic device 10 fetches the image generated by the first terminal device TM1 according to the monitoring command, and determines whether unintentional invasion happens. If any unintentional invasion does happen, the primary electronic device 10 generates and transfers the alarm message to the second terminal device TM2 so as to inform the operator beside or close to the second terminal device TM2. If the primary electronic device 10 accidentally fails to perform the normal function, the spare electronic device 20 is directly activated to take over the primary electronic device 10 and continue the monitoring operation without ceasing or terminating so as to guarantee the safety if the target site. Especially, the operator can keep monitoring the target site and does not need to wait for the primary electronic device 10 being repaired. It is thus possible to implement seamless monitoring in case of the primary electronic device crashing, and further save time because other components or devices in the system still normally function and will not cease operating due to the primary electronic device 10. Moreover, the upstream device UD may transmit the failure/invalidation message to the second terminal device TM2 or another terminal device to inform the operator, who can take necessary actions to inspect or replace the invalidated primary electronic device 10.

From the above-mentioned, one aspect of the present invention is that the specific packet is used by the microcontroller to determine whether the primary electronic device abnormally works or invalidated, and if yes, the microcontroller activates the spare electronic device to take over the primary electronic device and continue the task performed by the primary electronic device, thereby preventing the system from being invalidated or crashing. Thus, the present invention is suitably applied to specific systems with high stability and reliability of operation, such as high-end network system, including the high-end server array for electronic business, or the monitoring system for the electric power plant, nuclear power plant or power transmission lines.

Another aspect of the present invention is that the primary and spare electronic devices have the same operational environment, that is, the same hardware environment like the same upstream device, microcontroller, terminal devices, and the same software environment like BIOS. In particular, the primary and second electronic devices are controlled by the upstream device to handle the terminal devices such that the temporary data processed by the primary electronic device does not need to be backup during the process of switching the primary electronic device to the second electronic device, thereby greatly simplifying the switching procedure and attaining the aim of smoothly switching to the spare electronic device. Furthermore, only one package of software is needed to install in the upstream device, and shared by the primary and spare electronic devices. As a result, the cost for software license fee is reduced and the industrial utility is increased.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for preventing system invalidation, the system comprising a primary electronic device, at least one spare electronic device, a microcontroller, at least two terminal devices and an upstream device, wherein the microcontroller is connected to the primary electronic device and the at least one spare electronic device through a transmission interface, the primary electronic device and the at least one spare electronic device are electrically connected to the terminal devices through an electrical connection circuitry, the upstream device is connected to the primary electronic device and the at least one spare electronic device through a connection interface, the upstream device contains at least a power-on command, generates and transfers operation commands via the connection interface, the primary electronic device receives the operation commands to control the at least two terminal devices to provide a specific service, and the at least one spare electronic device is not involved in providing the specific service when the primary electronic device operates, the method for preventing system invalidation comprising:

using the microcontroller to transfer a specific packet to the primary electronic device via the transmission interface;
the primary electronic device receiving the specific packet and then returning a return packet to the microcontroller to complete a response procedure;
the microcontroller receiving the return packet from the primary electronic device;
the microcontroller inspecting the return packet and determining whether a period of time between the specific packet transferring and the return packet received is within a preset range;
the primary electronic device being determined to be normal and repeating the above steps if the period of time is within the preset range;
the primary electronic device being determined to be abnormal if the period of time is not within the preset range;
the microcontroller selecting a spare electronic device from one of the at least one spare electronic device and turning on power supply of the spare electronic device;
the spare electronic device receiving a power-on command from the upstream device to perform a power-on procedure;
the microcontroller prohibiting the primary electronic device from controlling the at least two terminal devices, and activating the spare electronic device to receive the operation commands from the upstream device;
the spare electronic device controlling the at least two terminal devices according to the operation commands such that the spare electronic device takes over the primary electronic device to provide the specific service; and
shutting down power supply of the primary electronic device within a preset safe period of time.

2. The method as claimed in claim 1, wherein the specific packet comprises a heartbeat packet.

3. The method as claimed in claim 1, wherein the return packet is the specific packet, or different from the specific packet.

4. The method as claimed in claim 1, wherein the upstream device is a BIOS (basic input/output system), a device computer or server comprising the BIOS, the primary and spare electronic devices are selected from a group consisting of a microcomputer, computer and server, and the terminal device is selected from a group consisting of a hard disk, disk array, display device, computer, mobile phone, tablet PC and electronic terminal.

5. The method as claimed in claim 1, wherein the transmission interface is a serial transmission interface comprising RS-232 or serial port interface, the electrical connection circuitry comprises wire or wireless network, and the connection interface comprises SATA (Serial Advanced Technology Attachment) interface, or USB (universal serial bus) interface of flash memory interface.

* * * * *